United States Patent
Kim et al.

(10) Patent No.: US 11,183,744 B2
(45) Date of Patent: Nov. 23, 2021

(54) SECONDARY BATTERY

(71) Applicant: LG Chem, Ltd., Seoul (KR)

(72) Inventors: Su Hyun Kim, Daejeon (KR); Song Taek Oh, Daejeon (KR)

(73) Assignee: LG Chem, Ltd.

(*) Notice: Subject to any disclaimer, the term of this patent is extended or adjusted under 35 U.S.C. 154(b) by 218 days.

(21) Appl. No.: 16/468,897

(22) PCT Filed: Jul. 5, 2018

(86) PCT No.: PCT/KR2018/007669
§ 371 (c)(1),
(2) Date: Jun. 12, 2019

(87) PCT Pub. No.: WO2019/009650
PCT Pub. Date: Jan. 10, 2019

(65) Prior Publication Data
US 2019/0372084 A1    Dec. 5, 2019

(30) Foreign Application Priority Data
Jul. 7, 2017 (KR) .......................... 10-2017-0086688

(51) Int. Cl.
*H01M 2/34* (2006.01)
*H01M 2/02* (2006.01)
(Continued)

(52) U.S. Cl.
CPC ....... *H01M 50/581* (2021.01); *H01M 10/052* (2013.01); *H01M 50/107* (2021.01); *H01M 50/531* (2021.01); *H01M 50/578* (2021.01)

(58) Field of Classification Search
None
See application file for complete search history.

(56) References Cited

U.S. PATENT DOCUMENTS

| | | |
|---|---|---|
| 2002/0119364 A1 | 8/2002 | Bushong et al. |
| 2005/0026033 A1 | 2/2005 | Kawano et al. |
| | (Continued) | |

FOREIGN PATENT DOCUMENTS

| | | |
|---|---|---|
| CN | 1581560 A | 2/2005 |
| CN | 104603985 A | 5/2015 |
| | (Continued) | |

OTHER PUBLICATIONS

International Search Report for PCT/KR2018/007669 dated Oct. 2, 2018.
(Continued)

*Primary Examiner* — Lisa S Park
(74) *Attorney, Agent, or Firm* — Lerner, David, Littenberg, Krumholz & Mentlik, LLP

(57) ABSTRACT

The present invention relates to a secondary battery that is capable of being improved in safety.
Also, the secondary battery according to the present invention comprises a case accommodating an electrode assembly and an electrolyte, a lead part electrically connected to the electrode assembly and extending to the outside of the case, and a current interruption part disposed between the electrode assembly and the lead part to electrically disconnect the electrode assembly from the lead part at a predetermined temperature and a predetermined pressure.

20 Claims, 7 Drawing Sheets

(51) Int. Cl.
*H01M 10/52* (2006.01)
*H01M 2/26* (2006.01)
*H01M 50/581* (2021.01)
*H01M 10/052* (2010.01)
*H01M 50/107* (2021.01)
*H01M 50/531* (2021.01)
*H01M 50/578* (2021.01)

(56) References Cited

U.S. PATENT DOCUMENTS

| | | |
|---|---|---|
| 2006/0017580 A1 | 1/2006 | Hess et al. |
| 2007/0054157 A1 | 3/2007 | Ryu et al. |
| 2010/0291421 A1 | 11/2010 | Byun et al. |
| 2011/0104520 A1 | 5/2011 | Ahn |
| 2012/0196164 A1 | 8/2012 | Kim |
| 2012/0225333 A1 | 9/2012 | Kim |
| 2015/0072185 A1 | 3/2015 | Cho et al. |
| 2015/0188305 A1 | 7/2015 | Choi et al. |
| 2016/0028068 A1 * | 1/2016 | Yang .................. H01M 50/172 429/61 |
| 2016/0190657 A1 | 6/2016 | Hirose et al. |
| 2018/0053976 A1 | 2/2018 | Park et al. |

FOREIGN PATENT DOCUMENTS

| | | | |
|---|---|---|---|
| CN | 105027326 | A | 11/2015 |
| EP | 2950371 | A1 | 12/2015 |
| JP | H0536400 | * | 2/1993 |
| JP | H0536400 | A | 2/1993 |
| JP | H06203827 | A | 7/1994 |
| JP | 2000067846 | A | 3/2000 |
| JP | 2000182598 | A | 6/2000 |
| JP | 2006504244 | A | 2/2006 |
| JP | 2011-210390 | * | 10/2011 |
| JP | 2011210390 | A | 10/2011 |
| JP | 2015028882 | A | 2/2015 |
| JP | 2015536536 | A | 12/2015 |
| JP | 2016532991 | A | 10/2016 |
| KR | 20050013226 | A | 2/2005 |
| KR | 20070028228 | A | 3/2007 |
| KR | 20070075007 | A | 7/2007 |
| KR | 20110048470 | A | 5/2011 |
| KR | 101106999 | B1 | 1/2012 |
| KR | 101222306 | B1 | 1/2013 |
| KR | 101243546 | B1 | 3/2013 |
| KR | 20150045241 | A | 4/2015 |
| KR | 101551036 | B1 | 9/2015 |
| KR | 20160035424 | A | 3/2016 |
| WO | 2016171517 | A1 | 10/2016 |

OTHER PUBLICATIONS

Extended European Search Report with Written Opinion for Application No. 18827527.5 dated Jan. 3, 2020, 9 pages.
Search Report from Office Action for Chinese Application No. 201880004960.1 dated Jun. 22, 2021; 3 pages.

* cited by examiner

SECONDARY BATTERY

CROSS-REFERENCE TO RELATED APPLICATION

This application is a national phase entry under 35 U.S.C. § 371 of International Application No. PCT/KR2018/007669, filed on Jul. 5, 2018, published in Korean, which claims priority from Korean Patent Application No. 10-2017-0086688, filed on Jul. 7, 2017, the disclosures of which are hereby incorporated herein by reference.

TECHNICAL FIELD

The present invention relates to a secondary battery, and more particularly, to a secondary battery that is improved in safety.

BACKGROUND ART

Lithium secondary batteries have been continuously improved in energy density and are being utilized in various applications such as wearable applications.

In this situation, the importance of safety in addition to the performance of the battery has been emphasized, and many studies have been done to improve safety.

In addition, recently, users are demanding rapid charging in a short time, and various high-speed battery chargers and unauthorized chargers are sold in the market.

In such a situation, a voltage higher than the rated voltage of the battery may be applied due to the unauthorized charger, and thus, there is an increasing possibility that the battery may be overcharged, or the battery is likely to be exposed to situations that are capable of affecting safety, such as ignition.

A secondary battery comprising a stacking-type electrode assembly according to the related art and having improved safety is disclosed in Korean Patent Publication No. 10-2005-0013226.

In the secondary battery according to the related art, when an internal pressure of the battery increases, a short circuit may forcibly occur from the outside to melt a lead provided in the battery and thereby to block a path through which current flows, thereby securing safety of the battery.

However, when the lead of such a current interruption device is disconnected, a front end of an electrode is overheated due to contact resistance, and thus, the electrode is evaporated to generate metal vapor, thereby causing an arc discharge.

In addition, even when the internal pressure of the battery increases in a battery end-of-life period, the current interruption device operates to disconnect the lead.

DISCLOSURE OF THE INVENTION

Technical Problem

Therefore, the present invention has been made to solve the above problem, and an object of the present invention is to provide a secondary battery in which current is interrupted when each of a temperature and a pressure reach specific conditions.

Technical Solution

A secondary battery according to an embodiment of the present invention comprises a case accommodating an electrode assembly and an electrolyte therein, a lead part electrically connected to the electrode assembly and extending to the outside of the case, and a current interruption part disposed between the electrode assembly and the lead part, the current interruption part being configured to electrically disconnect the electrode assembly from the lead part when a temperature and a pressure within the current interruption part is equal to or greater than a predetermined temperature and a predetermined pressure, respectively.

The current interruption part may comprise a main body comprising a lead-side conductive part electrically connected to the lead part, an electrode-side conductive part electrically connected to the electrode assembly and an insulation layer electrically insulating the lead-side conductive part from the electrode-side conductive part, and a switch member made of a conductive material so as to be movable within the main body, wherein, the current interruption part is configured such that when the temperature within the current interruption part is below 60° C., or the pressure within the current interruption part is below 1 bar, the switch member may be disposed at a connection position, in which the lead-side conductive part and the electrode-side conductive part are electrically connected to each other by the switch member, and when the temperature and the pressure within the current interruption part is equal to or greater than the predetermined temperature and the predetermined pressure, respectively, the switch member may move to an interruption position, at which the lead-side conductive part and the electrode-side conductive part are electrically disconnected from each other.

The current interruption part may comprise a main body comprising an electrode-side conductive part electrically connected to the electrode assembly and an insulation layer insulating the lead part from the electrode-side conductive part and a switch member made of a conductive material so as to be movable from an inside of the main body to an inside of the lead part, wherein, the current interruption part is configured such that when the temperature within the current interruption part is below 60° C., or the pressure within the current interruption part is below 1 bar, the switch member may be disposed at a connection position, in which the lead part and the electrode-side conductive part are electrically connected to each other by the switch member, and when the temperature and pressure within the current interruption part is equal to or greater than the predetermined temperature and the predetermined pressure, respectively, the switch member may move to an interruption position, at which the lead part and the electrode-side conductive part are electrically disconnected from each other.

The main body may comprise a moving tunnel, a surface of each of the lead-side conductive part, the insulation layer, and the electrode-side conductive part being exposed within the moving tunnel.

The main body may comprise a moving tunnel, a surface of each of the lead part, the insulation layer, and the electrode-side conductive part being exposed within the moving tunnel.

The switch member may be movable within the moving tunnel.

The current interruption member may also include a support member configured to restrict movement of the switch member within the moving tunnel when the support member is in a solid state, so that the lead-side conductive part and the electrode-side conductive part are electrically connected to each other while the switch member is disposed at the connection position.

The current interruption member may also include a support member configured to restrict movement of the switch member within the moving tunnel when the support member is in a solid state, so that the lead part and the electrode-side conductive part are electrically connected to each other while the switch member is disposed at the connection position.

The predetermined temperature may be 60° C., and the support member may be maintained in a solid state at a temperature less than the predetermined temperature and may be in a melted state at a temperature equal to or greater than the predetermined temperature so as to have fluidity.

A through passage may be provided in an end of the electrode-side conductive part to allow an internal space of the case to communicate with the moving tunnel, and the switch member may block the through passage when the switch member is disposed at the connection position.

A pressure within the case may be transmitted to the switch member through the through passage.

When the pressure within the case is transmitted to the switch member through the through passage and the support member is in the melted state, the switch member may be configured to move to the interruption position, thereby electrically insulating the lead part from the electrode-side conductive part.

The predetermined temperature may range from 60° C. to 120° C., and the predetermined pressure may range from 1 bar to 4 bars.

When the switch member is at the connection position, the switch member may have one end electrically connected to the lead-side conductive part and the other end electrically connected to the electrode-side conductive part.

When the switch member is at the connection position, the switch member may have one end electrically connected to the lead part and the other end electrically connected to the electrode-side conductive part.

The switch member may be made of a copper (Cu) material.

The case may be coupled to or sealed to the insulation layer.

The support member may be made of a microcrystalline wax or a polymer material.

Advantageous Effects

According to the present invention, when all of the temperature and pressure conditions are satisfied, the current may be interrupted to improve the safety of the secondary battery.

According to the present invention, even though the internal pressure of the battery increases in the battery end-of-life period within the normal operation temperature, the lead part may not be disconnected.

According to the present invention, the sealing coupling between the lead part and the case may be easily and firmly realized.

MODE FOR CARRYING OUT THE INVENTION

A reason in which a current interruption part 100 operates to interrupt current between an electrode assembly 1 and a lead part 3 when all of predetermined temperature and pressure conditions are satisfied in a secondary battery is for preventing the current from being interrupted when a normal operation temperature (−30° C. to 50° C.) is maintained even though a gas is generated in a battery end-of-life (EOL) period to increase in internal pressure of the secondary battery.

Figure 1:
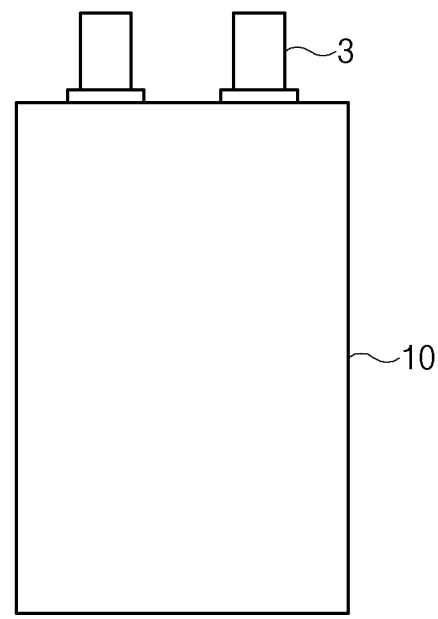
FIG. 1 is a front view of a secondary battery according to an embodiment of the present invention.
Figure 2:
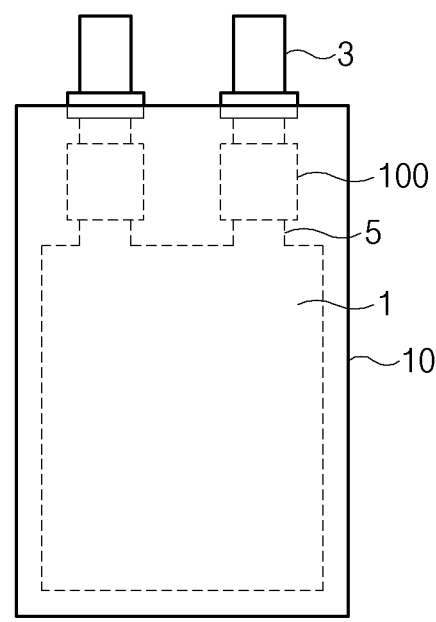
FIG. 2 is an interior projective view illustrating internal main parts of FIG. 1.
Figure 3:
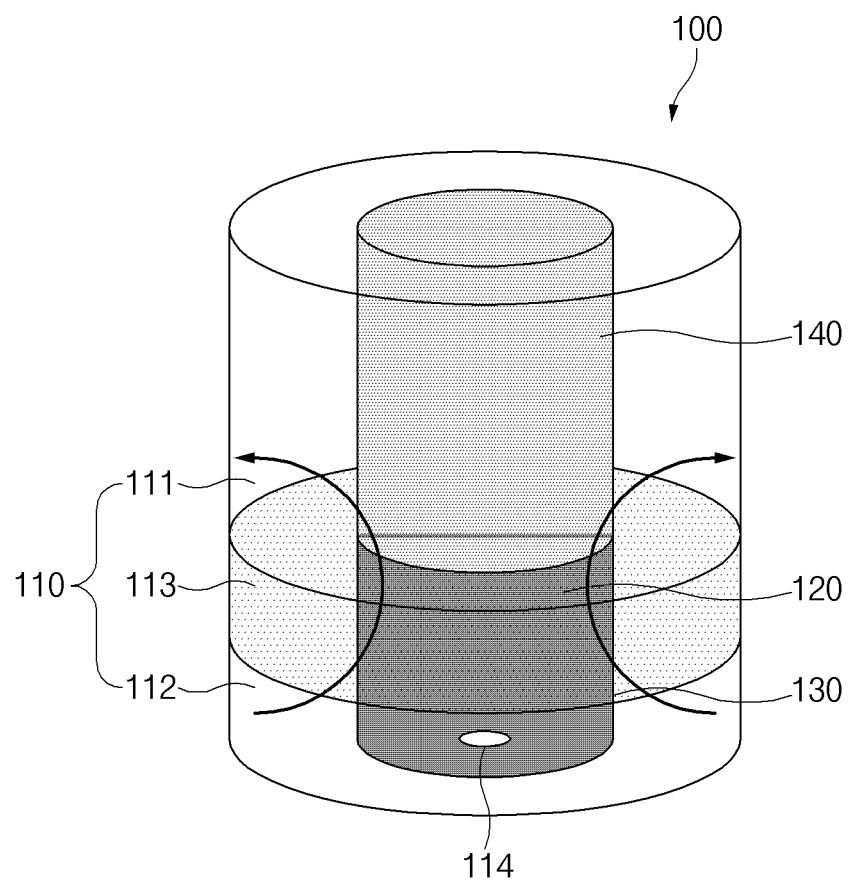
FIG. 3 is a perspective view illustrating internal main parts of only a current interruption part at a connection position in the secondary battery according to an embodiment of the present invention.

FIG. 3 is a perspective view illustrating internal main parts of only a current interruption part at a connection position in the secondary battery according to an embodiment of the present invention.

Referring to FIG. 3, a current interruption member 100 may comprise a main body 110 and a switch member 120 that is movable within the main body 110 and made of a conductive material such as copper (Cu).

The main body 110 may comprise a lead-side conductive part 111 electrically connected to a lead part 3, an electrode-side conductive part 112 electrically connected to an electrode assembly 1, and an insulation layer 113 insulating the lead-side conductive part 111 from the electrode-side conductive part 112.

The main body 110 may comprise a moving tunnel 130 connecting the lead-side conductive part 111, the insulation layer 113, and the electrode-side conductive part 112 to each other.

The moving tunnel 130 may provide a passage through which the switch member 120 is movable from the inside of the main body 110 toward the electrode-side conductive part 112 or the lead-side conductive part 111.

When a temperature is below 60° C., or a pressure is below 1 bar, the switch member 120 may be disposed at a connection position, at which the lead-side conductive part 111 and the electrode-side conductive part 112 are electrically connected to each other, within the main body 110. When reaching a predetermined temperature and a predetermined pressure, the switch member 120 may move to an interruption position, at which the lead-side conductive part 111 and the electrode-side conductive part 112 are electrically disconnected from each other, within the main body 110.

The state in which the switch member 120 moves to the electrode-side conductive part 112 may be referred to as the connection position, and the state in which the switch member 120 moves to the lead-side conductive part 111 may be referred to as the interruption position.

The switch member 120 may have a circumference corresponding to that of the moving tunnel 130. Also, the switch member 120 may have a length less than that of the moving tunnel 130 and have a size so that the switch member 120 is movable within the moving tunnel 130.

When the switch member 120 moves to the electrode-side conductive part 112, the switch member 120 may have one end contacting the electrode-side conductive part 112 and the other end contacting the lead-side conductive part 111 so that current flows from the electrode assembly 1 to the lead part 3. In an embodiment, the current may flow as shown by an arrow in FIG. 3.

A support member 140 may be formed on a portion of the moving tunnel 130, which is disposed in the lead-side conductive part 111.

The support member 140 may be disposed on an end of the moving tunnel 130, which is disposed inside the lead-side conductive part 111, to support the switch member 120, thereby preventing the switch member 120 from moving toward the lead-side conductive part 111.

The support member 140 may be made of a material such as a microcrystalline wax or polymer, which is maintained in a solid state at a temperature less than 60° C. and melted at a predetermined temperature so as to have fluidity.

A through passage 114 may be punched in an end of the electrode-side conductive part 112.

The through passage 114 may have a passage through which an internal space of a case 10 and the moving tunnel 130 communicate with each other.

Also, since the switch member 120 blocks the through passage 114 at the connection position, the internal space of the case 10 and the moving tunnel 130 may not communicate with each other.

Figure 4:
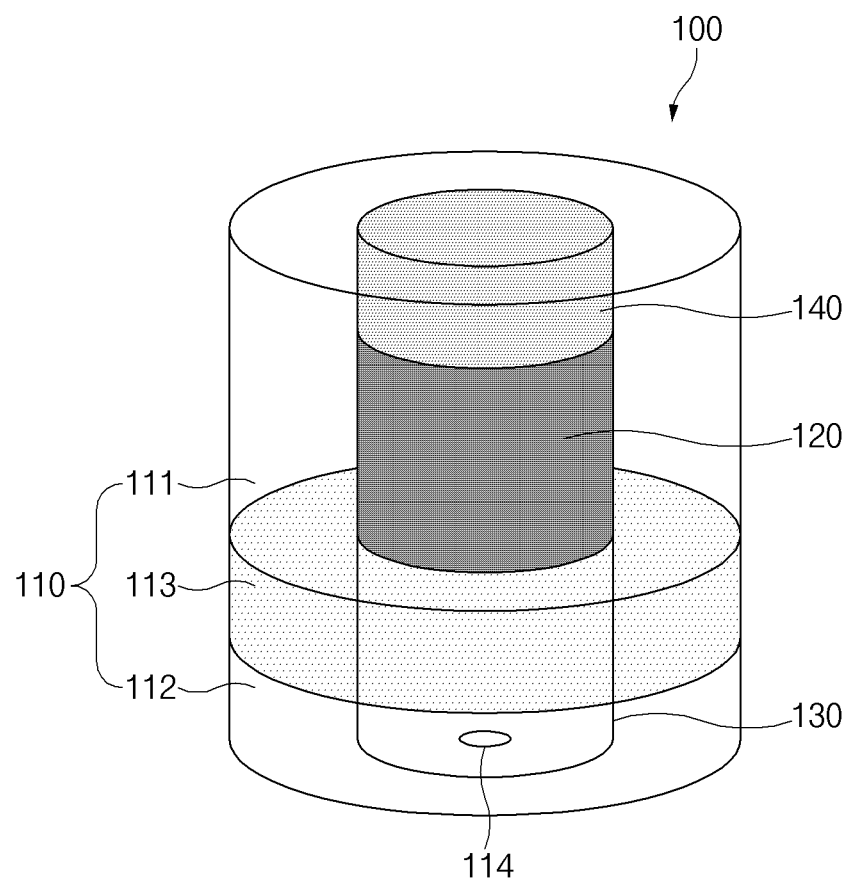
FIG. 4 is a perspective view illustrating internal main parts of only a current interruption part at an interruption position in the secondary battery according to an embodiment of the present invention.

FIG. 4 is a perspective view illustrating internal main parts of only the current interruption part at the interruption position in the secondary battery according to an embodiment of the present invention.

As illustrated in FIG. 4, when an internal pressure of the case 10 increases to a predetermined pressure, the internal pressure of the case 10 may be transmitted to the switch member 120 through the through passage 114 to push the switch member 120 to the lead-side conductive part 111.

Here, when the temperature is below 60° C., the support member 140 may be maintained in the solid state to restrict the movement of the switch member 120. When reaching the predetermined temperature, the support member 140 may be melted to give the fluidity, and thus, supporting force supporting the switch member 120 may be weak so that the switch member 120 moves to the interruption position.

When the switch member 120 moves to the lead-side conductive part 111 and then is disposed at the interruption position, the one end of the switch member 120 may not contact the electrode-side conductive part 112, but only the other end of the switch member 120 may contact the lead-side conductive part 111 so that the electrode assembly 1 and the lead part 3 is disconnected from each other so as not to be electrically connected to each other.

Figure 5:
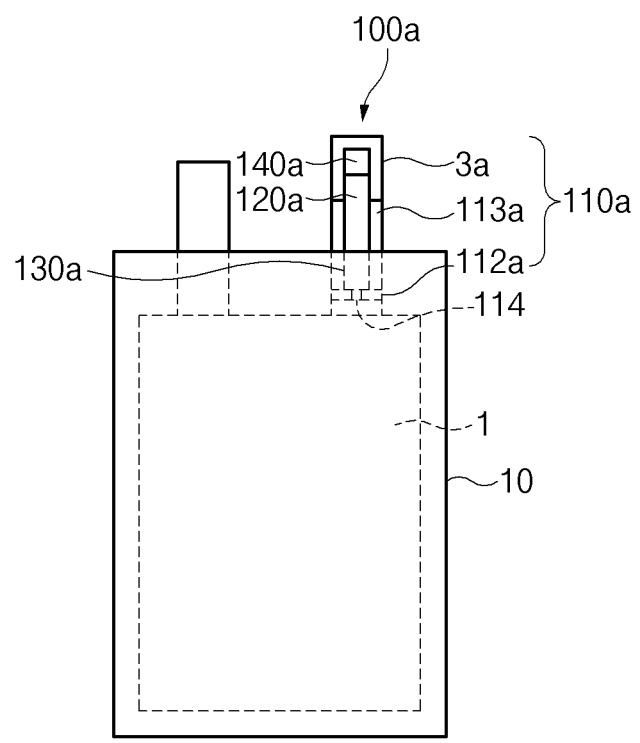
FIG. 5 is a front projective view illustrating internal main parts in a secondary battery according to another embodiment of the present invention.
Figure 6:
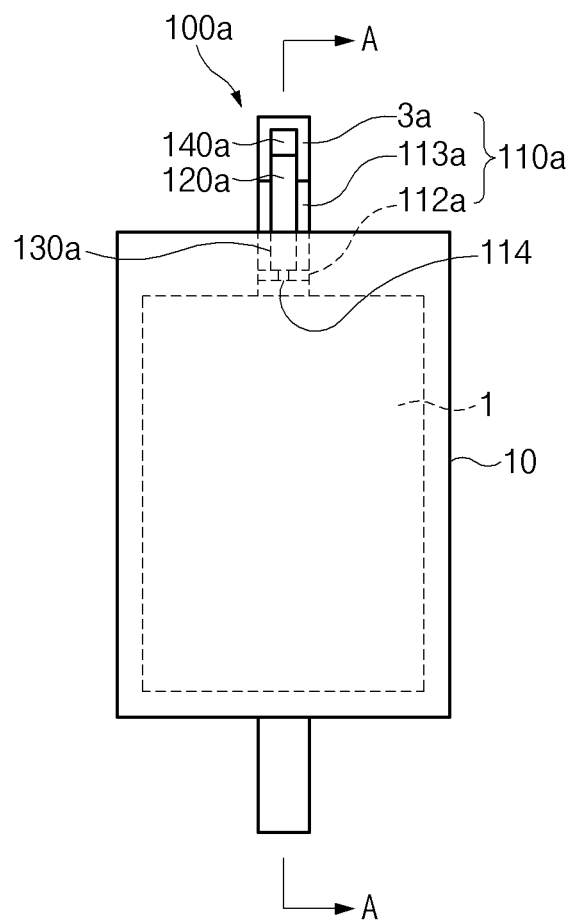
FIG. 6 is a front projective view illustrating internal main parts in a secondary battery according to further another embodiment of the present invention.

FIG. 5 is a front projective view illustrating internal main parts in a secondary battery according to another embodiment of the present invention, and FIG. 6 is a front projective view illustrating internal main parts in a secondary battery according to further another embodiment of the present invention.

As illustrated in FIG. 5 or 6, in a secondary battery according to various embodiments of the present invention, a current interruption part 100a comprising a lead part 3a may be provided.

A main body 110a of the current interruption part 100a may comprise an electrode-side conductive part 112a electrically connected to an electrode assembly 1 and an insulation layer 113a insulating a lead part 3a from the electrode-side conductive part 112a.

The main body 110a may comprise a moving tunnel 130a, which connects the lead part 3a, the insulation layer 113a, and the electrode-side conductive part 112a to each other, therein.

The moving tunnel 130a may provide a passage through which a switch member 120a is movable from the inside of the main body 110a toward the electrode-side conductive part 112a or the lead part 3a.

The switch member 120a may be made of a conductive material that is formed in the moving tunnel 130a to as to be movable from the electrode-side conductive part 112a up to the lead part 3a.

When a temperature is below 60° C., or a pressure is below 1 bar, the switch member 120a may be disposed at a connection position, at which the lead part 3a and the electrode-side conductive part 112a are electrically connected to each other. When reaching a predetermined temperature and a predetermined pressure, the switch member 120a may move to an interruption position, at which the lead part 3a and the electrode-side conductive part 112a are electrically disconnected from each other.

A support member 140a may be formed on a portion of the moving tunnel 130a, which is disposed in the lead part 3a.

The support member 140a may be disposed on an end of the moving tunnel 130a, which is disposed inside the lead part 111a, to support the switch member 120a, thereby preventing the switch member 120a from moving toward the lead part 111a.

An operation principle of the switch member 120a according to various embodiments may be the same as that of the switch member 120 according to the foregoing embodiment.

Figure 7:
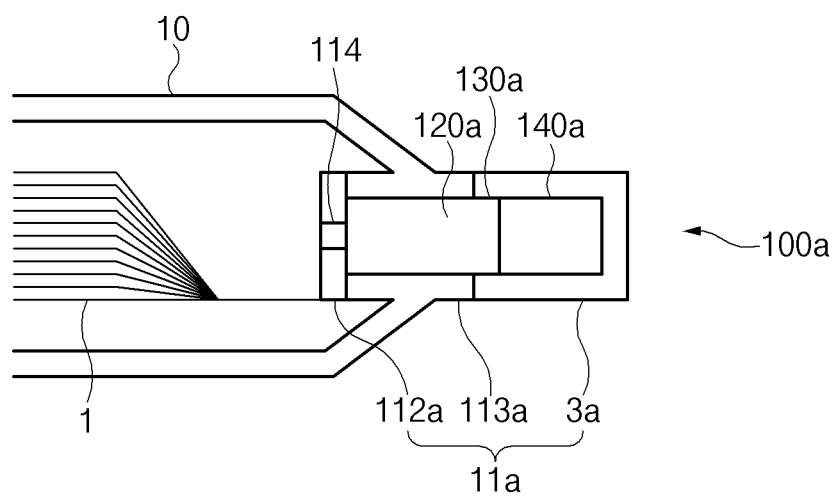
FIG. 7 is a cross-sectional view of main parts, taken along line A-A of FIG. 6.

FIG. 7 is a cross-sectional view of main parts, taken along line A-A of FIG. 6.

As illustrated in FIG. 7, in a secondary battery according to further another embodiment of the present invention, an insulation layer 113a of a current interruption part 100a and a case 10 may be coupled or sealed to each other.

That is, the insulation layer 113a may be made of a material such as a resin, rubber, plastic or the like. When contact portions between the case 10 and the insulation layer 113a are thermally welded to each other, the sealing coupling may be easily and firmly realized.

As described above, according to the present invention, when all of the temperature and pressure conditions are satisfied, the current may be interrupted to improve safety of the secondary battery.

According to the present invention, even though the internal pressure of the battery increases in the battery end-of-life period within the normal operation temperature, the lead part may not be disconnected.

According to the present invention, the sealing coupling between the lead part and the case may be easily and firmly realized.

Although the secondary battery according to the present invention has been described above with reference to the exemplary drawings, various changes and modifications may be made thereto by one skilled in the art without departing from the scope and spirit of the invention as set forth in the appended claims.

The invention claimed is:

1. A secondary battery comprising:
   a case accommodating an electrode assembly and an electrolyte therein;
   a lead part electrically connected to the electrode assembly and extending to an outside of the case; and a current interruption part disposed between the electrode assembly and the lead part, the current interruption part being configured to electrically disconnect the electrode assembly from the lead part when a temperature and a pressure within the current interruption part are equal to or greater than a predetermined temperature and a predetermined pressure, respectively, the current interruption part including a main body including an insulation layer electrically insulating the lead part from the electrode assembly, and a switch member made of a conductive material and movable within the main body, wherein, the current interruption part is configured such that when the switch member is disposed at a connection position, the lead part and the electrode assembly are electrically connected to each other by the switch member, and when the temperature and the pressure within the current interruption part is equal to or greater than the predetermined temperature and the predetermined pressure, respectively, the switch member moves to an interruption position, at which the lead part and the electrode assembly are electrically disconnected from each other.

2. The secondary battery of claim 1, wherein the main body includes a lead-side conductive part electrically connected to the lead part, an electrode-side conductive part electrically connected to the electrode assembly, and the insulation layer electrically insulating the lead-side conductive part from the electrode-side conductive part, wherein, the current interruption part is configured such that when the temperature within the current interruption part is below 60° C., or the pressure within the current interruption part is below 1 bar, the switch member is disposed at the connection position, in which the lead-side conductive part and the electrode-side conductive part are electrically connected to each other by the switch member, and when the switch member moves to the interruption position the lead-side conductive part and the electrode-side conductive part are electrically disconnected from each other.

3. The secondary battery of claim 1, wherein the main body includes an electrode-side conductive part electrically connected to the electrode assembly and the insulation layer electrically insulating the lead part from the electrode-side conductive part; and the switch member being movable from an inside of the main body to an inside of the lead part, wherein, the current interruption part is configured such that when the temperature within the current interruption part is below 60° C., or the pressure within the current interruption part is below 1 bar, the switch member is disposed at the connection position, in which the lead part and the electrode-side conductive part are electrically connected to each other by the switch member, and when the switch member moves to the interruption position the lead part and the electrode-side conductive part are electrically disconnected from each other.

4. The secondary battery of claim 2, wherein the main body comprises a moving tunnel, a surface of each of the lead-side conductive part, the insulation layer, and the electrode-side conductive part being exposed within the moving tunnel.

5. The secondary battery of claim 3, wherein the main body comprises a moving tunnel, a surface of each of the lead part, the insulation layer, and the electrode-side conductive part being exposed within the moving tunnel.

6. The secondary battery of claim 4, wherein the switch member is movable within the moving tunnel.

7. The secondary battery of claim 4, wherein the current interruption member further comprises a support member configured to restrict movement of the switch member within the moving tunnel when the support member is in a solid state, so that the lead-side conductive part and the electrode-side conductive part are electrically connected to each other while the switch member is disposed at the connection position.

8. The secondary battery of claim 5, wherein the current interruption member further comprises a support member configured to restrict movement of the switch member within the moving tunnel when the support member is in a solid state, so that the lead part and the electrode-side conductive part are electrically connected to each other while the switch member is disposed at the connection position.

9. The secondary battery of claim 7, wherein the predetermined temperature is 60° C., and the support member is maintained in a solid state at a temperature less than the predetermined temperature and is in a melted state at a temperature equal to or greater than the predetermined temperature so as to have fluidity.

10. The secondary battery of claim 9, wherein a through passage is provided in an end of the electrode-side conductive part to allow an internal space of the case to communicate with the moving tunnel, and the switch member blocks the through passage when the switch member is disposed at the connection position.

11. The secondary battery of claim 10, wherein a pressure within the case is transmitted to the switch member through the through passage.

12. The secondary battery of claim 11, wherein, when the pressure within the case is transmitted to the switch member through the through passage and the support member is in the melted state, the switch member is configured to move to the interruption position, thereby electrically insulating the lead part from the electrode-side conductive part.

13. The secondary battery of claim 1, wherein the predetermined temperature is between 60° C. and 120° C., and the predetermined pressure is between 1 bar and 4 bars.

14. The secondary battery of claim 2, wherein, when the switch member is at the connection position, the switch member has one end electrically connected to the lead-side conductive part and the other end electrically connected to the electrode-side conductive part.

15. The secondary battery of claim 3, wherein, when the switch member is at the connection position, the switch member has one end electrically connected to the lead part and the other end electrically connected to the electrode-side conductive part.

16. The secondary battery of claim 2, wherein the switch member is made of a copper (Cu) material.

17. The secondary battery of claim 2, wherein the case is coupled or sealed to the insulation layer.

18. The secondary battery of claim 7, wherein the support member is made of a microcrystalline wax or a polymer material.

19. The secondary battery of claim 5, wherein the switch member is movable within the moving tunnel.

20. The secondary battery of claim 8, wherein the predetermined temperature is 60° C., and the support member is maintained in a solid state at a temperature less than the predetermined temperature and is in a melted state at a temperature equal to or greater than the predetermined temperature so as to have fluidity.

\* \* \* \* \*